US011143568B2

(12) United States Patent
Tapia et al.

(10) Patent No.: US 11,143,568 B2
(45) Date of Patent: Oct. 12, 2021

(54) INSPECTION SYSTEM FOR DETECTING MISALIGNED SEALS (71) Applicant: The Boeing Company, Chicago, IL (US)

(72) Inventors: William J. Tapia, Kapowsin, WA (US); Shereef G. Shehab, Seattle, WA (US); Michael D. Fogarty, Auburn, WA (US)

(73) Assignee: The Boeing Company, Chicago, IL (US)

( * ) Notice: Subject to any disclaimer, the term of this patent is extended or adjusted under 35 U.S.C. 154(b) by 115 days.

(21) Appl. No.: 16/735,086

(22) Filed: Jan. 6, 2020

(65) Prior Publication Data

US 2021/0208020 A1 Jul. 8, 2021

(51) Int. Cl.
*G01M 3/24* (2006.01)
*B65B 57/02* (2006.01)

(52) U.S. Cl.
CPC ............ *G01M 3/24* (2013.01); *B65B 57/02* (2013.01)

(58) Field of Classification Search
CPC ...................................................... G01M 3/24
See application file for complete search history.

(56) References Cited

U.S. PATENT DOCUMENTS

| 4,020,688 | A | * | 5/1977 | Hauldren | E21B 3/00 73/152.43 |
| 4,487,072 | A | * | 12/1984 | Livingston | G01N 29/07 73/622 |
| 4,649,926 | A | * | 3/1987 | Abbott | G01S 15/894 600/445 |
| 4,718,277 | A | * | 1/1988 | Glascock | G01N 29/2493 73/622 |
| 4,843,884 | A | * | 7/1989 | House | G01N 29/26 73/622 |
| 5,007,291 | A | * | 4/1991 | Walters | G01N 29/043 226/176 |
| 7,293,461 | B1 | * | 11/2007 | Girndt | G01N 29/04 310/336 |
| 8,515,687 | B2 | * | 8/2013 | Pereira | F16L 11/127 702/34 |
| 8,857,269 | B2 | * | 10/2014 | Johnson | A61M 5/16877 73/861.18 |
| 9,528,903 | B2 | * | 12/2016 | Zusman | F16L 55/28 |
| 10,261,053 | B2 | * | 4/2019 | Ten Grotenhuis | G01S 15/8997 |

\* cited by examiner

*Primary Examiner* — Paul M. West
*Assistant Examiner* — Mark A Shabman
(74) *Attorney, Agent, or Firm* — Vivacqua Crane (57) ABSTRACT An inspection system for detecting one or more misaligned seals is disclosed and includes a linear transducer array connected to a sleeve. The linear transducer array includes a plurality of ultrasonic transducers each configured to transmit and receive ultrasonic waves. The ultrasonic transducers direct the ultrasonic waves towards one or more seals that are disposed underneath the sleeve. The inspection system also includes a rotational device configured to move the ultrasonic transducers around a circumference of the sleeve, one or more processors in electronic communication with the linear transducer array, and a memory coupled to the one or more processors. The memory stores data into a database and program code that, when executed by the one or more processors, causes the inspection system to instruct the plurality of ultrasonic transducers to transmit and receive the ultrasonic waves.

20 Claims, 7 Drawing Sheets

INSPECTION SYSTEM FOR DETECTING MISALIGNED SEALS

INTRODUCTION

The present disclosure relates to inspection systems. More particularly, the present disclosure is directed towards an inspection system for detecting misaligned seals, where the inspection system includes a linear transducer array including a plurality of ultrasonic transducers.

BACKGROUND

A cup seal includes two legs that are connected to one another. The cup seal's two legs extend away from one another at an angle. In one application, the cup seal is installed around a tubular member, such as a collar. Specifically, the cup seal is placed within a groove disposed around the collar, and then an outer sleeve is slid over the collar. When installed correctly, an upper leg of the cup seal abuts against a surface of the outer sleeve. The upper leg of the cup seal creates a seal between the outer sleeve and the collar. In some instances, the upper leg of the cup seal that is supposed to contact the outer surface of the outer sleeve rolls over during installation. This adversely affects the seal between the sleeve and the outer collar. However, the cup seal is not pressure tested until the entire structure has been assembled together. Accordingly, the cup seal's rolled leg is not detected until the entire structure has been built. As a result, an individual has to disassemble all of the installed components and reinstall the cup seal back into the correct position. This process may become labor intensive, time consuming, and costly.

SUMMARY

According to several aspects, an inspection system for detecting one or more misaligned seals disposed underneath a sleeve. The inspection system includes a linear transducer array connected to the sleeve, the linear transducer array includes a plurality of ultrasonic transducers that are each configured to transmit and receive ultrasonic waves, where the ultrasonic transducers direct the ultrasonic waves towards one or more seals that are disposed underneath the sleeve. The inspection system includes a rotational device configured to move the ultrasonic transducers around a circumference of the sleeve. The inspection system also includes one or more processors in electronic communication with the linear transducer array and a memory coupled to the one or more processors. The memory stores data into a database and program code that, when executed by the one or more processors, causes the inspection system to instruct the plurality of ultrasonic transducers to transmit and receive the ultrasonic waves, where the rotational device rotates around the sleeve as the plurality of ultrasonic transducers transmit and receive the ultrasonic waves. The inspection system continues to instruct the plurality of ultrasonic transducers to transmit and receive the ultrasonic waves until the linear transducer array translates around the circumference of the sleeve. Finally, the inspection system generates an acoustic representation of the one or more seals disposed underneath the sleeve based on the ultrasonic waves received by the plurality of ultrasonic transducers, wherein the acoustic representation of the one or more seals indicates sound dampened areas where the one or more seals contact the sleeve.

In another aspect, an inspection system for detecting one or rolled cup seals disposed underneath a sleeve is disclosed. The inspection system includes a linear transducer array connected to the sleeve and having a plurality of ultrasonic transducers each configured to transmit and receive ultrasonic waves, where the ultrasonic transducers direct the ultrasonic waves towards one or more cup seals that are disposed underneath the sleeve. The inspection system also includes a rotational device configured to move the ultrasonic transducers around a circumference of the sleeve, one or more processors in electronic communication with the linear transducer array, and a memory coupled to the one or more processors. The memory stores data into a database and program code that, when executed by the one or more processors, causes the inspection system to instruct the plurality of ultrasonic transducers to transmit and receive the ultrasonic waves, where the rotational device rotates around the sleeve as the plurality of ultrasonic transducers transmit and receive the ultrasonic waves. The inspection system continues to instruct the plurality of ultrasonic transducers to transmit and receive the ultrasonic waves until the linear transducer array translates around the circumference of the sleeve. Finally, the inspection system generates an acoustic representation of the one or more cup seals disposed underneath the sleeve based on the ultrasonic waves received by the plurality of ultrasonic transducers, where the acoustic representation of the one or more cup seals indicates sound dampened areas where the one or more cup seals contact the sleeve.

In still another aspect, a method for detecting one or more misaligned seals disposed underneath a sleeve is disclosed. The method includes instructing, by a computer, a plurality of ultrasonic transducers to transmit and receive ultrasonic waves as the plurality of ultrasonic transducers rotates around the sleeve, where the plurality of ultrasonic transducers are part of a linear transducer array. The method includes continuing to instruct the plurality of ultrasonic transducers to transmit and receive the ultrasonic waves until the linear transducer array translates around a circumference of the sleeve. Finally, the method includes generating an acoustic representation of one or more seals disposed underneath the sleeve based on the ultrasonic waves received by the plurality of ultrasonic transducers, where the acoustic representation of the one or more seals indicates sound dampened areas where the one or more seals contact the sleeve.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards an inspection system for detecting one or more misaligned seals. In one embodiment, the inspection system may detect a rolled cup seal. The inspection system includes a linear transducer array having a plurality of ultrasonic transducers that are each configured to transmit and receive ultrasonic waves. The linear transducer array is translated around an outer surface of the sleeve. A control module is in electronic communication with the linear transducer array. An acoustic representation of the seal is generated upon a screen, where the acoustic representation is based on the ultrasonic waves and indicates sound dampened areas where the seal contacts the sleeve. Accordingly, an individual may detect a rolled or otherwise incorrectly installed seal without the need to assemble all of the components in a structure, perform a pressure test, and then disassemble the entire structure in order to access a rolled cup seal.

The following description is merely exemplary in nature and is not intended to limit the present disclosure, application, or uses.

Figure 1:
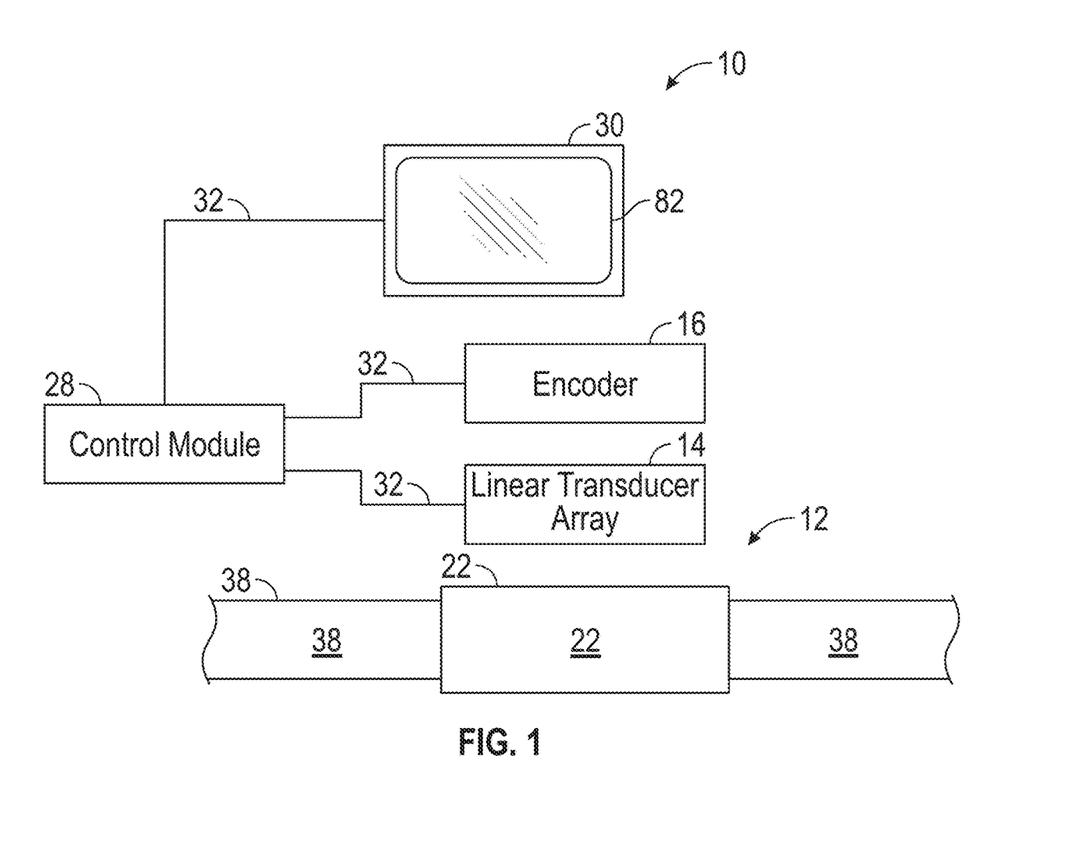
FIG. 1 is a schematic diagram of the disclosed inspection system installed upon a sleeve assembly, according to an exemplary embodiment.

Referring to FIG. 1, a schematic diagram of an inspection system 10 for a sleeve assembly 12 is shown. The inspection system 10 is configured to detect one or more misaligned seals 20 disposed around a sleeve 22 of the sleeve assembly 12 (seen in FIG. 2). The inspection system 10 includes a linear transducer array 14, an encoder 16, and a control module 28 in electronic communication with the linear transducer array 14 and the encoder 16. The inspection system 10 also includes a display device 30 in electronic communication with the control module 28. In the non-limiting embodiment as shown in FIG. 1, the control module 28 is in electronic communication with the linear transducer array 14, the encoder 16, and the display device 30 by wires such as, for example, data communication cables 32. However, in another embodiment the control module 28 is in electronic communication with the linear transducer array 14, the encoder 16, and the display using a wireless connection.

Figure 2:
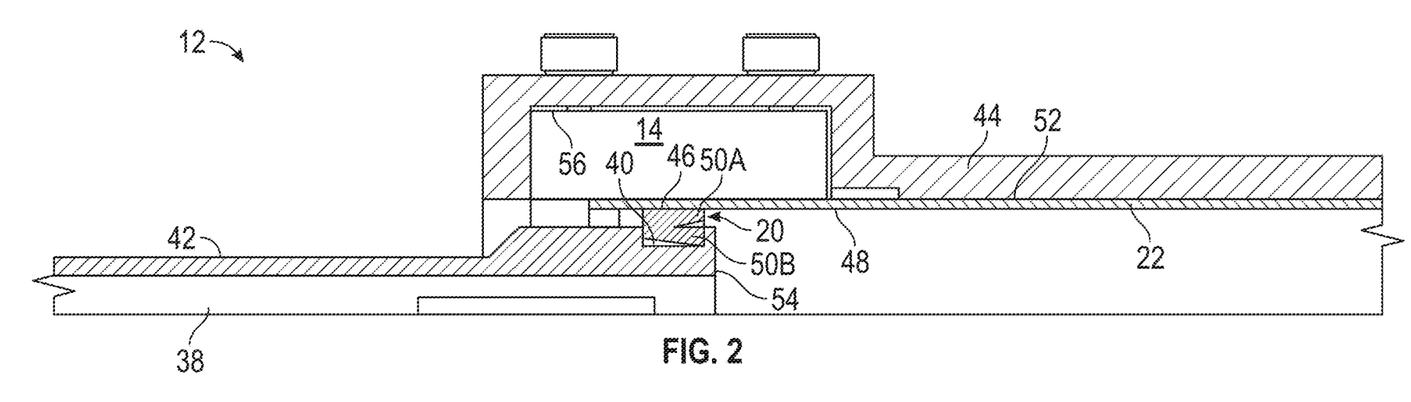
FIG. 2 is a cross-sectioned view of the sleeve assembly, including a seal disposed around a sleeve, according to an exemplary embodiment.

The sleeve assembly 12 includes two tube sections 38 that are fluidly connected to one another by the sleeve 22. In other words, the sleeve 22 unites the two tube section 38 together. FIG. 2 is a cross-sectioned view of the sleeve assembly 12. FIG. 2 shows a groove 40 disposed around an outer surface 42 of one of the tube sections 38. The groove 40 of the tube section 38 is shaped to receive a seal 20, where the sleeve 22 surrounds the seal 20. The linear transducer array 14 is then placed over the sleeve 22 and a portion of the tube section 38. A collar 44 is then placed over the sleeve 22. In the embodiment as shown in the figures, the seal 20 is a cup seal. That is, the seal 20 includes two legs 50A, 50B that extend at an angle away from one another. In the embodiment as shown in FIG. 2, the upper leg 50A is installed correctly. Therefore, a side surface 46 of the upper leg 50A of the seal 20 makes contact and seals against an innermost surface 48 of the sleeve 22.

Figure 3:
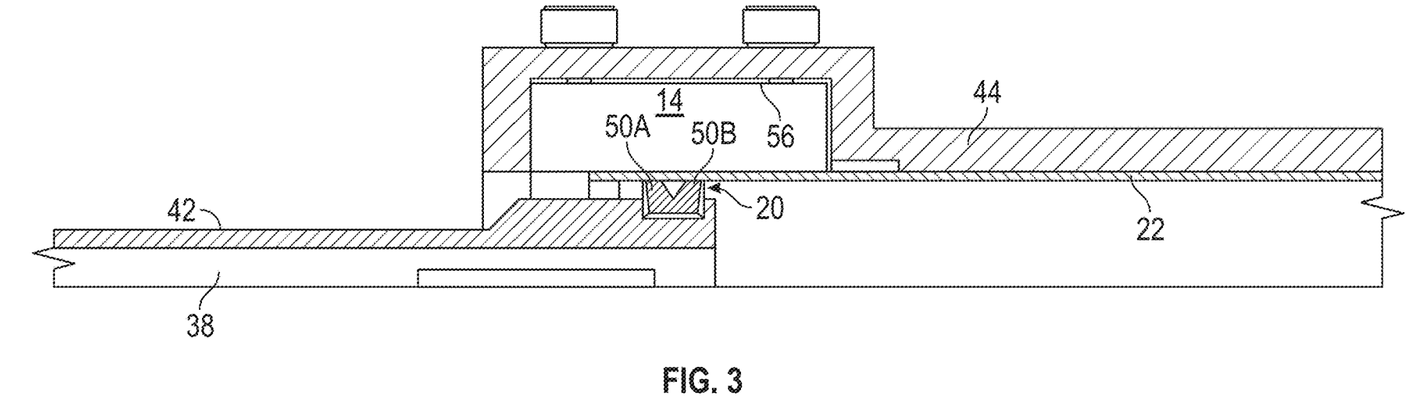
FIG. 3 illustrates the seal in FIG. 2 in a rolled position, according to an exemplary embodiment.

During assembly, the sleeve 22 is slid over the two tube sections 38. Sometimes during assembly as the sleeve 22 slides over the two tube sections 38, the seal 20 may roll over into the position as shown in FIG. 3. Referring now to FIG. 3, when the seal 20 rolls over the side surface 46 of the upper leg 50A no longer contacts the innermost surface 48 of the sleeve 22. When the side surface 46 of the upper leg 50A no longer contacts and seals against the sleeve 22, this is referred to as a rolled cup seal. As explained below, the disclosed inspection system 10 (shown in FIG. 1) detects the rolled cup seal. It is to be appreciated that while the figures illustrate the seals 20 as cup seals, this disclosure is not limited to only cup seals, and the inspection system 10 is configured to detect other types of compromised seals as well.

Figure 6:
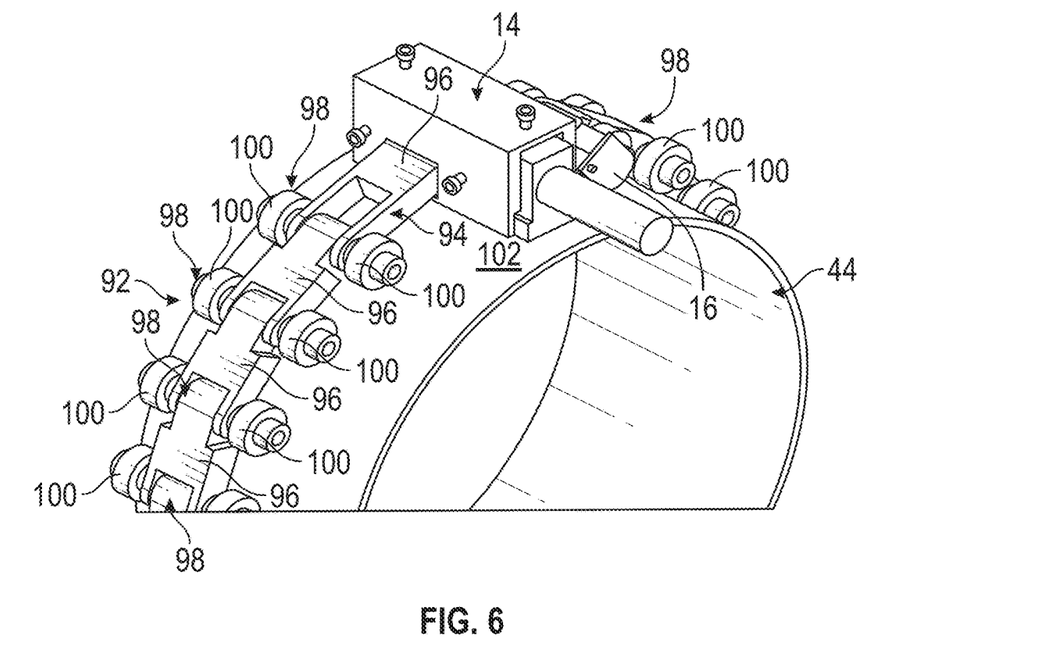
FIG. 6 is a perspective view of the linear transducer array, an encoder, a collar, and a rotational device, according to an exemplary embodiment.

Referring back to FIG. 2, the linear transducer array 14 is positioned along an outermost surface 52 of the sleeve 22. Specifically, the linear transducer array 14 is positioned over an edge 54 of one of the tube sections 38, and directly above the seal 20. The linear transducer array 14 is connected to the collar 44. Referring to FIGS. 2 and 6, the collar 44 is configured to circumferentially surround the outermost surface 52 of the sleeve 22. For example, in the embodiment as shown in FIG. 2, the collar 18 includes a cavity 56 shaped to receive and secure the linear transducer array 14.

Figure 4:
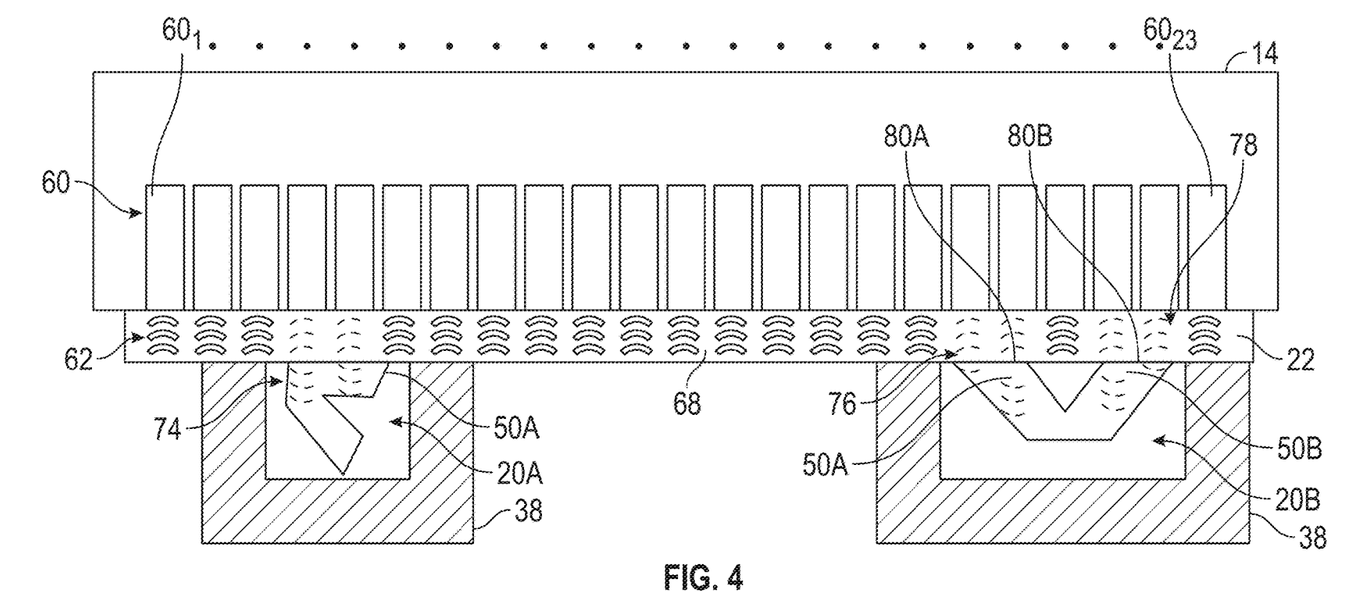
FIG. 4 is an enlarged schematic view of a linear transducer array including a plurality of ultrasonic transducers, where one of the seals is correctly installed but the remaining seal is rolled over, according to an exemplary embodiment.

FIG. 4 is an enlarged schematic view of the linear transducer array 14 where one of the seals 20A is correctly installed, however, the remaining seal 20B, is rolled over. The linear transducer array 14 includes a plurality of ultrasonic transducers 60 that are arranged in a linear direction along the tube section 38. The plurality of ultrasonic transducers 60 are piezoelectric elements that are each configured to transmit and receive ultrasonic waves 62. Specifically, the ultrasonic transducers 60 are each configured to the generate ultrasonic waves 62 in response to experiencing a voltage pulse.

Referring to both FIGS. 1 and 4, the control module 28 sends a pulsed voltage to plurality of ultrasonic transducers 60, and in response to receiving the pulsed voltage, the ultrasonic transducers 60 generate the ultrasonic waves 62. Specifically, the control module 28 sends a pulsed voltage to a portion of the ultrasonic transducers 60 simultaneously. For example, in the non-limiting embodiment as shown in FIG. 4, the linear transducer array 14 includes twenty-three individual ultrasonic transducers 60, which are numbered from $60_1$ to $60_{23}$. In one non-limiting embodiment, the control module 28 sends a pulsed voltage to six adjacent ultrasonic transducers $60_1$-$60_6$. The control module 28 then repeats sending the pulsed voltage for the next successive set of ultrasonic transducers 60 (i.e., ultrasonic transducers $60_2$-$60_7$). The control module 28 continues to repeat sending the pulsed voltage until all of the ultrasonic transducers 60 have generated the ultrasonic waves 62.

Referring specifically to FIG. 4, the ultrasonic waves 62 travel through a wall 68 of the tube section 38. However, a portion of the ultrasonic waves 62 are transmitted into the seals 20, which are directly in contact with the tube section 38. For example, the seal 20A, which is correctly installed, absorbs a portion 74 of the ultrasonic waves 62 that travel along the upper leg 50A. The seal 20B, which has rolled over, absorbs two discrete portions 76, 78 of the ultrasonic waves 62 that travel through two ends 80A, 80B of the two legs 50A, 50B of the seal 20B.

Figure 5:
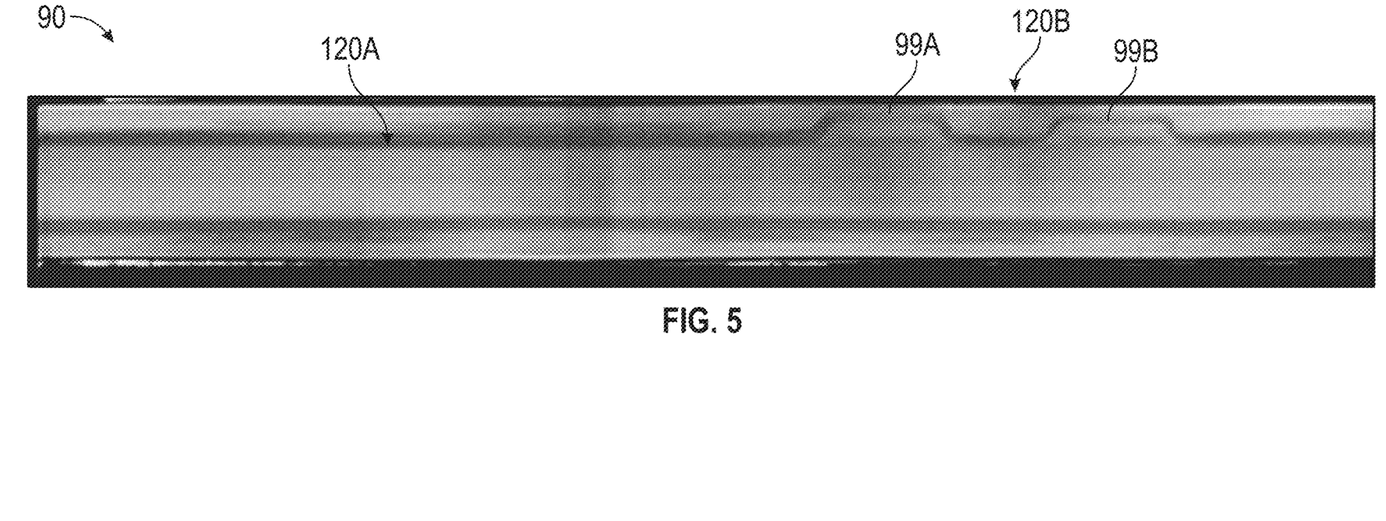
FIG. 5 is an acoustic representation of the two seals shown in FIG. 4, according to an exemplary embodiment.

An acoustic representation 90, which is sometimes referred to as a c-scan, is shown in FIG. 5. In the figures as shown, the acoustic representation 90 is a gray scale image that is shown upon a screen 82 of the display device 30 (FIG. 1), however, the acoustic representation 90 is not limited to gray scale representations. Specifically, the control module 28 generates the acoustic representation 90 based on the one or more seals 20A, 20B that are disposed underneath the sleeve 22 based on the ultrasonic waves 62 received by the ultrasonic transducers 60. The acoustic representation 90 of the one or more seals 20A, 20B indicates sound dampened areas where the one or more seals 20a, 20b contact the tube section 38. For example, the acoustic representation 90 shown in FIG. 5 includes two sound dampened areas, 120A and 120B. Specifically, the sound dampened area 120A corresponds to the seal 20A in FIG. 4 and the sound dampened area 120B corresponds to the seal 20B in FIG. 4.

Referring to both FIGS. 4 and 5, when the seal 20A is correctly installed, the portion 74 of the ultrasonic waves 62 absorbed by the upper leg 50A generates the sound dampened area 120A. The sound dampened area 120A seen in FIG. 5 is a single vertical strip representing the contact between the upper leg 50A of the seal and the tube section 38. In contrast, the seal 20B has rolled over. As a result, the two discrete portions 76, 78 of the ultrasonic waves 62 are absorbed by the two ends 80A, 80B of the legs 50A, 50B. Accordingly, the sound dampened area 120B includes two discrete raised lines 99A, 99B, where each raised line 99A, 99B represents one of the legs 50A, 50B of the seal. Accordingly, an individual may be able to tell if the seal 20 is correctly installed by viewing the acoustic representation 90 upon the screen 82 of the display device 30.

Although FIG. 4 illustrates the linear transducer array 14 including twenty-three individual ultrasonic transducers $60_1$-$60_{23}$, it is to be appreciated that FIG. 4 is merely exemplary in nature, and any number of ultrasonic transducers 60 may be used. It is also to be appreciated that that increasing the number of ultrasonic transducers 60 and placing them closer together may improve the resolution of the acoustic representation 90.

Figure 7:
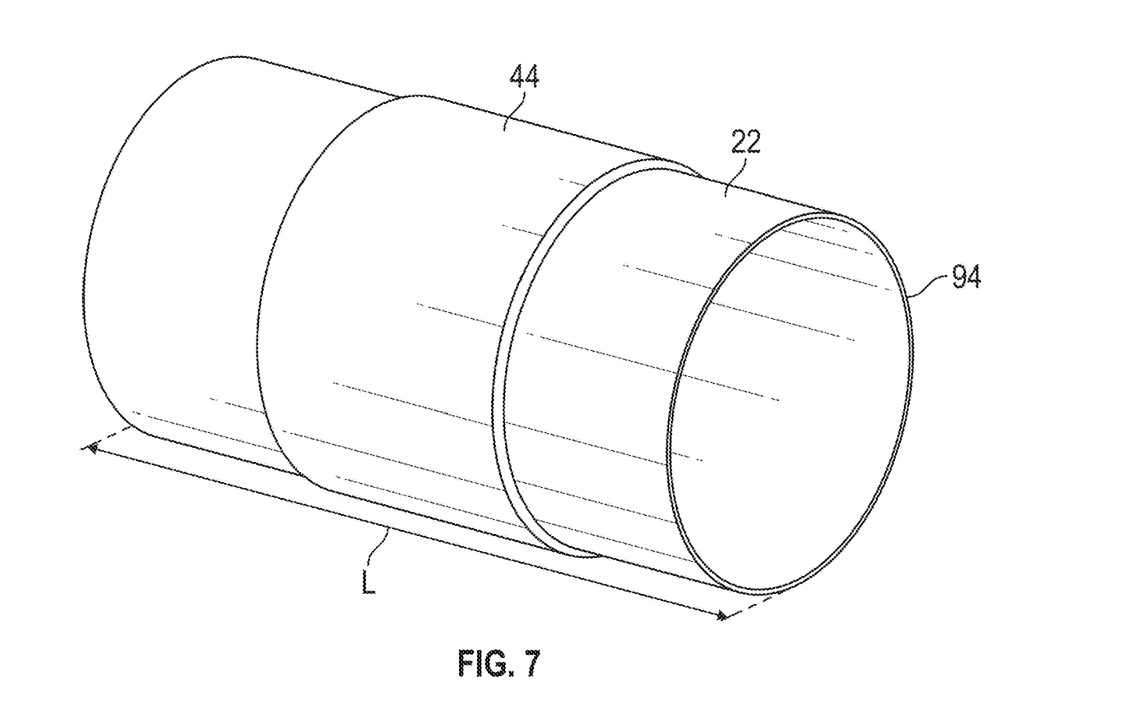
FIG. 7 is a perspective view of the collar 44 surrounding the sleeve, according to an exemplary embodiment.

FIG. 6 is a perspective view of the linear transducer array 14, the encoder 16, and the collar 44 that circumferentially surrounds the sleeve 22, and FIG. 7 is a perspective view of the collar 44 surrounding the sleeve 22. The inspection system 10 (FIG. 1) further includes a rotational device 92 (FIG. 6) configured to translate the linear transducer array 14 around a circumference 94 of the sleeve 22. The rotational device 92 allows for the linear transducer array 14 to scan the entirety of the seals 20. This is because sometimes a seal 20 rolls over around only a portion of the circumference 94 of the sleeve 22, while a remaining portion of the seal 20 is seated correctly within the groove 40 (FIG. 2). Referring to FIGS. 4, 5, 6 and 7, the ultrasonic transducers 60 are arranged linearly along a portion of the length L of the sleeve 22 (FIG. 7). The linear transducer array 14 is translated around the circumference 94 of the sleeve 22. In an embodiment, the linear transducer array 14 is translated around the entire circumference 94 of the sleeve 22, which results in a 360 degree scan of the seal 20. Accordingly, the acoustic representation 90 is a full circumferential representation of the seals 20.

In the non-limiting embodiment as shown in FIG. 6, the rotational device 92 includes a linked chain 94 that surrounds the collar 44. The linked chain 94 is comprised of a plurality of linking elements 96. Each linking element 96 is connected to an adjacent linking element 96 by a rolling element 98. The rolling elements 98 each include two opposing wheels 100. Each wheel 100 rolls around an outermost surface 102 of the collar 44, and around the entire circumference 94 of the sleeve 22 (FIG. 7). In one embodiment, an operator may manually urge the rotational device 92 in either a clockwise or a counterclockwise direction around the sleeve 22. However, in another embodiment, the rotational device 92 may be connected to a motor, where the motor provides the rotational motion required to translate the rotational device 92 around the sleeve 22.

Figure 8:
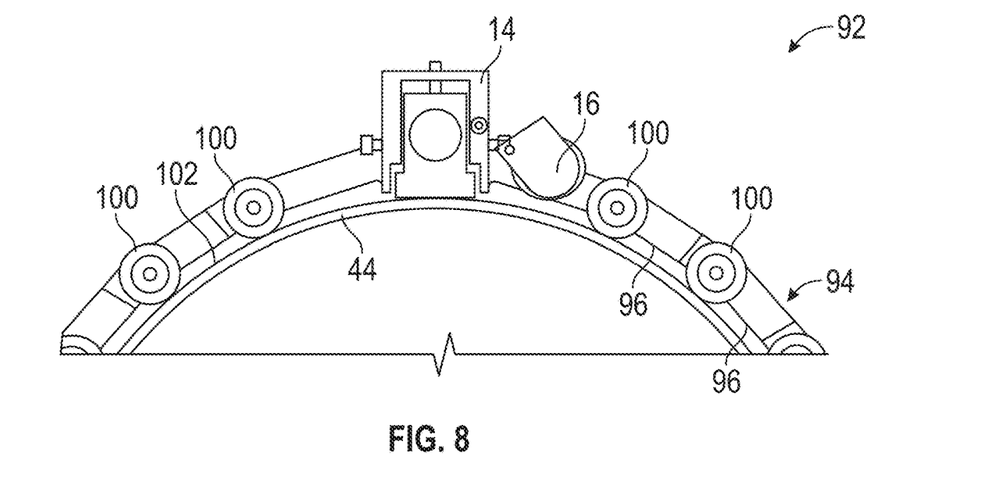
FIG. 8 is a front view of the linear transducer array, the encoder, the collar, and the rotational device, according to an exemplary embodiment.

FIG. 8 is a front view of the linear transducer array 14, the encoder 16, the collar 44, and the rotational device 92. Referring to FIGS. 1, 4, 7, and 8, the encoder 16 is configured to send signals to the control module 28 indicating a relative position of the linear transducer array 14 around the circumference of the sleeve 22. The control module 28 instructs the ultrasonic transducers 60 (FIG. 4) of the linear transducer array 14 to transmit and receive the ultrasonic waves 62 at a specific rate as the linear transducer array 14 travels around the sleeve 22. For example, in one non-limiting embodiment, the control module 28 instructs the ultrasonic transducers 60 to send and receive the ultrasonic waves 62 about every 0.025 millimeters (¹⁄₁,₀₀₀ of an inch) as the linear transducer array 14 is translated around the circumference 94 of the sleeve 22 (FIG. 7). The control module 28 takes a digital sample of the ultrasonic waves 62 at incremental circumferential distances around the sleeve 22, where the encoder 16 indicates the relative position of the linear transducer array 14 around the circumference 94 of the sleeve 22.

Although the figures illustrate the encoder 16, it is to be appreciated that in one embodiment the encoder 16 is omitted. Instead, the control module 28 records a digital sample of the ultrasonic waves 62 periodically, regardless of the relative position of the linear transducer array 14.

Figure 9:
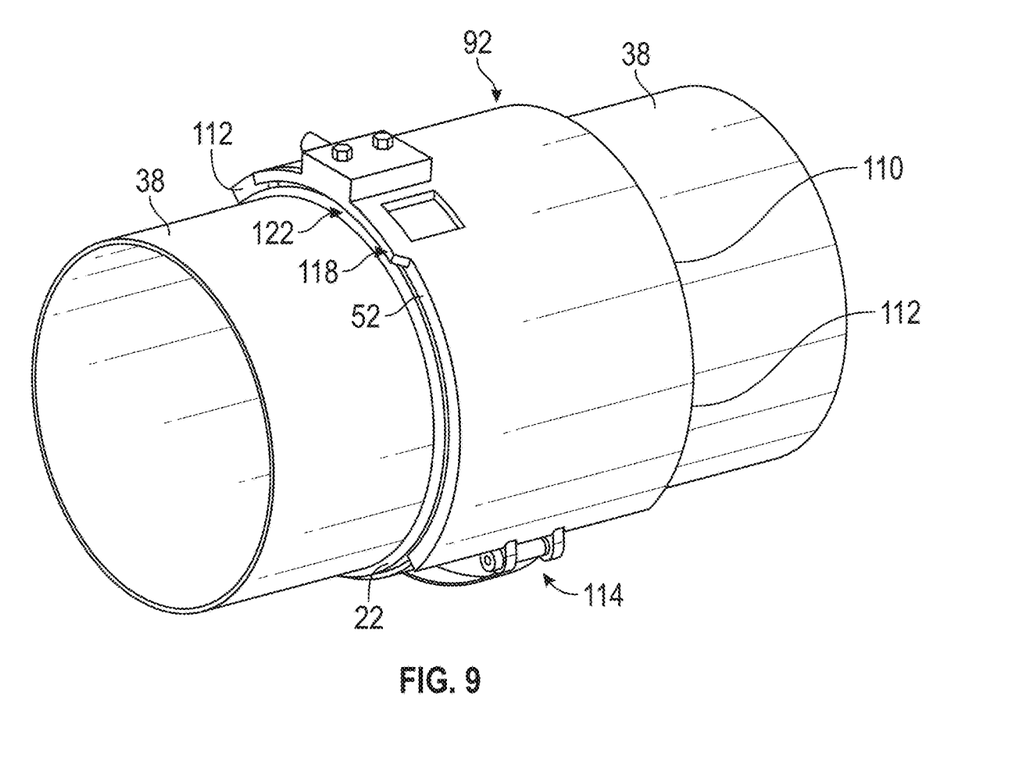
FIG. 9 is an alternative embodiment of the rotational device, according to an exemplary embodiment.

FIG. 9 illustrates an alternative embodiment of the rotational device 92. In the embodiment as shown in FIG. 9, the rotational device 92 includes a clamshell cover 110 that surrounds the sleeve 22. The clamshell cover 110 is shaped to correspond to the outermost surface 52 of the sleeve 22. The clamshell cover 110 includes two circumferential halves 112 that are joined together by a hinge 114. The clamshell cover 110 includes tabs 118 disposed around each open end 122 (only one tab 118 is shown in the figures). The tabs 118 are configured to act as a guide as the clamshell cover 110 is translated around the entire circumference 94 of the sleeve 22 (FIG. 7).

Figure 10:
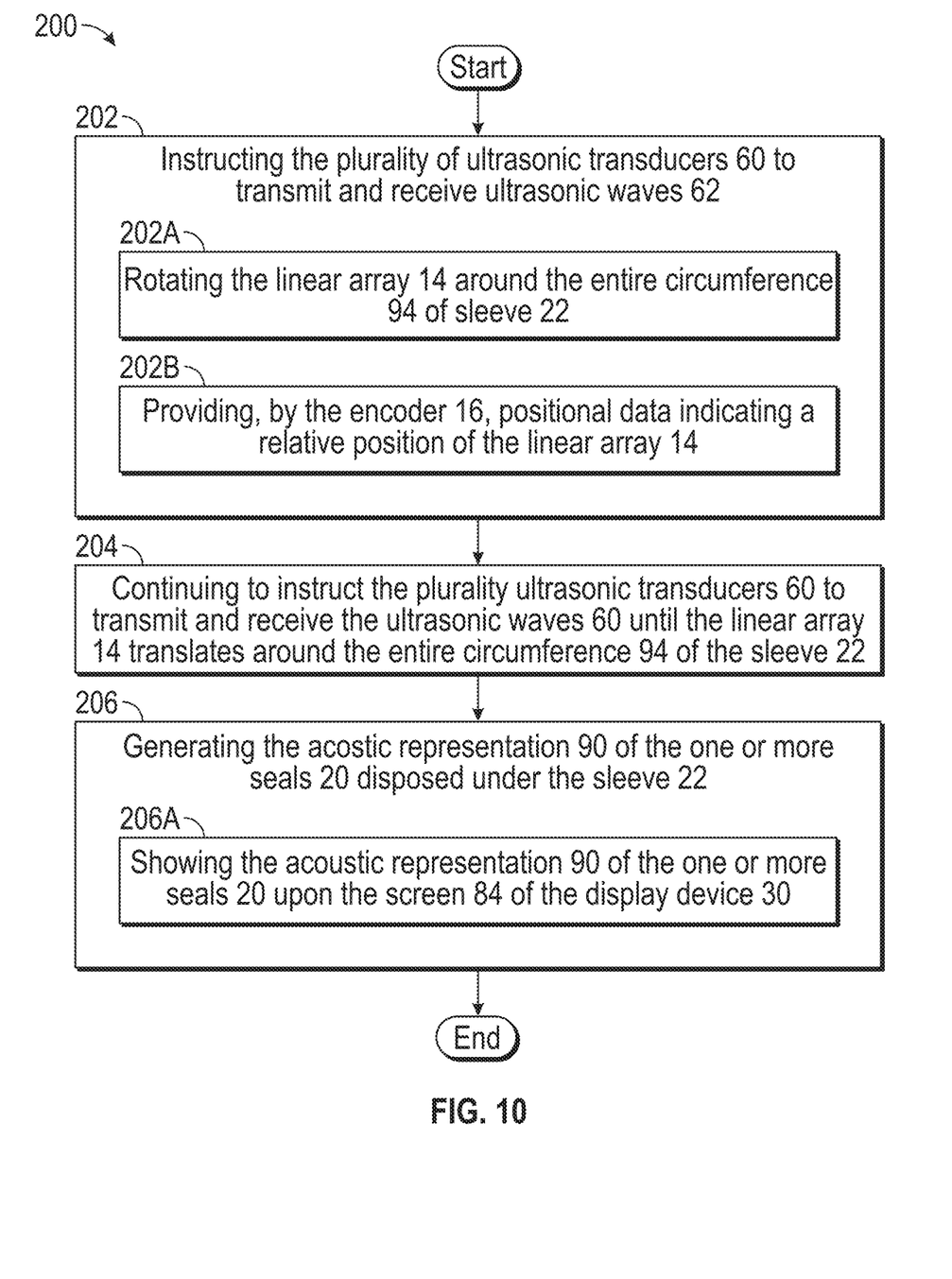
FIG. 10 is a process flow diagram illustrating a method for detecting one or more misaligned seals.

FIG. 10 is an exemplary process flow diagram illustrating a method 200 for detecting one or more misaligned seals 20 disposed underneath the sleeve 22. Referring to FIGS. 1-5 and 10, the method 200 begins at block 202. In block 202, the control module 28 instructs the plurality of ultrasonic transducers 60 to transmit and receive ultrasonic waves 62 as the plurality of ultrasonic transducers 60 rotate around the sleeve 22. As mentioned above, the plurality of ultrasonic transducers 60 are part of the linear transducer array 14. In block 202A, the linear transducer array 14 is rotated about the entire circumference 94 of the sleeve 22 by the rotational device 92. In block 202B, the encoder 16 provides positional data indicating a relative position of the linear transducer array 14 to the control module 28. As seen in FIGS. 6 and 8, the encoder 16 is connected to the rotational device 92. As mentioned above, in one embodiment the encoder 16 is omitted, and instead the control module 28 records a digital sample of the ultrasonic waves 62 periodically. The method 200 may then proceed to block 204.

In block 204, the control module 28 continues to instruct the plurality of ultrasonic transducers 60 to transmit and receive the ultrasonic waves 62 until the linear transducer array 14 translates around the entire circumference 94 of the sleeve 22. The method 200 may then proceed to block 206.

In block 206, the control module generates the acoustic representation 90 (FIG. 5) of one or more seals 20 disposed underneath the sleeve 22 based on the ultrasonic waves 62 received by the ultrasonic transducers 60, where the acoustic representation 90 of the one or more seals 20 indicates sound dampened areas where the one or more seals 20 contact the sleeve 22. In an embodiment, in block 206A, the acoustic representation 90 of the one or more seals 20 are shown upon the screen 84 of the display device 30 (FIG. 1). The method 200 may then terminate.

Referring generally to the figures, the disclosed inspection system provides various technical effects and benefits. Specifically, the disclosed inspection system provides individuals with the ability to detect a seal that has been incorrectly installed by viewing an acoustic representation upon a screen of a display device. In other words, the disclosed inspection system allows for an individual to detect an improperly installed seal, without the need to disassemble the sleeve assembly. This reduces the amount of time and labor required when installing sleeve assemblies.

Figure 11:
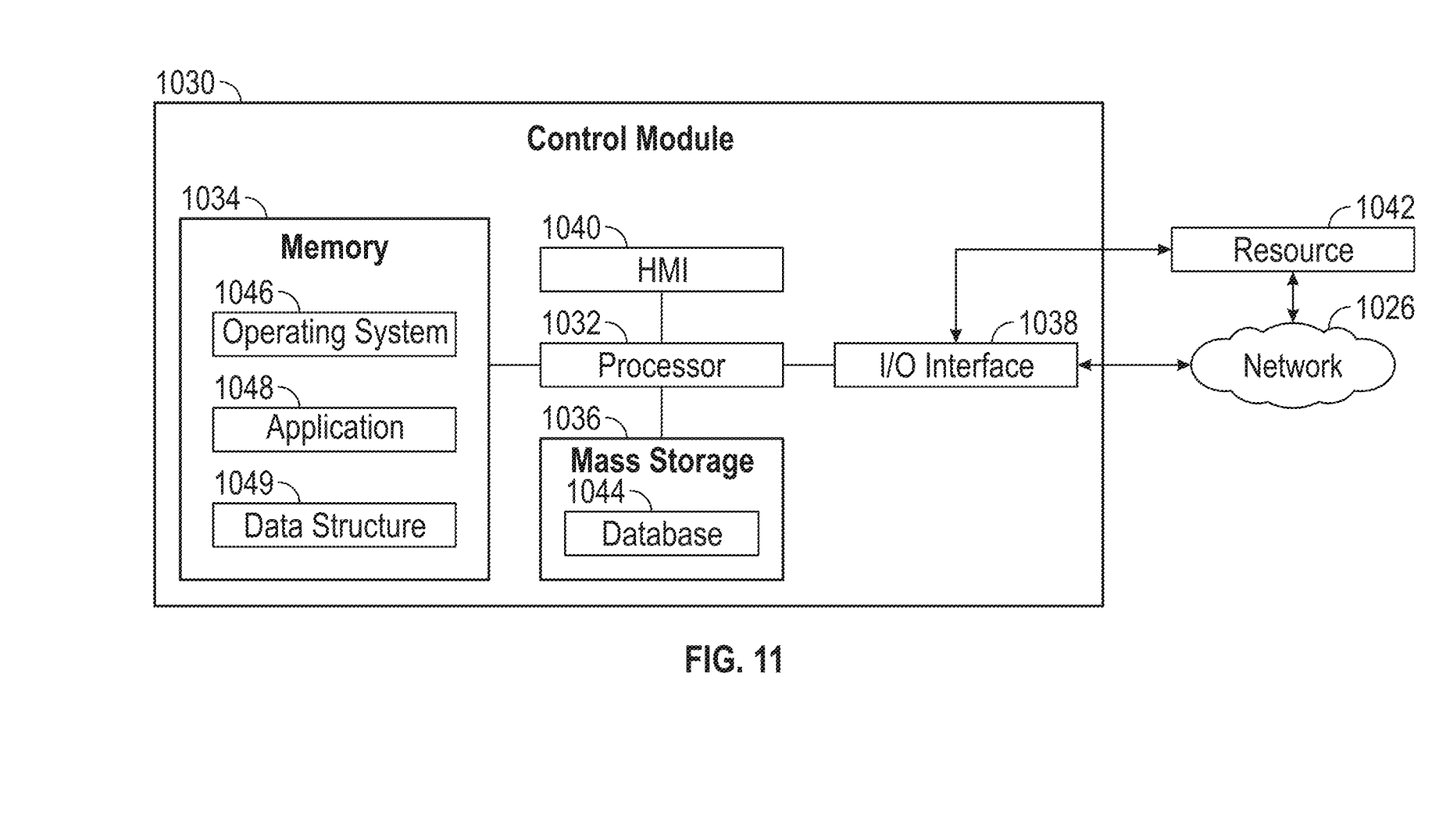
FIG. 11 is a computer system that is used in connection with the disclosed inspection system, according to an exemplary embodiment.

Referring now to FIG. 11, the control module 28 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An inspection system for detecting one or more misaligned seals disposed underneath a sleeve, the inspection system comprising:
   a linear transducer array connected to the sleeve and having a plurality of ultrasonic transducers each configured to transmit and receive ultrasonic waves, wherein the ultrasonic transducers direct the ultrasonic waves towards one or more seals that are disposed underneath the sleeve;

a rotational device configured to move the ultrasonic transducers around a circumference of the sleeve;

one or more processors in electronic communication with the linear transducer array; and a memory coupled to the one or more processors, the memory storing data into a database and program code that, when executed by the one or more processors, causes the inspection system to:

instruct the plurality of ultrasonic transducers to transmit and receive the ultrasonic waves, wherein the rotational device rotates around the sleeve as the plurality of ultrasonic transducers transmit and receive the ultrasonic waves;

continue to instruct the plurality of ultrasonic transducers to transmit and receive the ultrasonic waves until the linear transducer array translates around the circumference of the sleeve; and generate an acoustic representation of the one or more seals disposed underneath the sleeve based on the ultrasonic waves received by the plurality of ultrasonic transducers, wherein the acoustic representation of the one or more seals indicates sound dampened areas where the one or more seals contact the sleeve.

2. The inspection system of claim 1, further comprising a display device in electronic communication with the one or more processors, wherein the display device includes a screen.

3. The inspection system of claim 2, wherein the acoustic representation of the one or more seals is shown upon the screen.

4. The inspection system of claim 1, further comprising an encoder in electronic communication with the one or more processors, wherein the encoder is connected to the rotational device.

5. The inspection system of claim 4, wherein the encoder is configured to provide positional data indicating a relative position of the linear transducer array around the circumference of the sleeve to the one or more processors.

6. The inspection system of claim 4, further comprising a collar that extends around the circumference of the sleeve, wherein the collar is connected to the encoder and the rotational device.

7. The inspection system of claim 1, wherein the one or more processors record a digital sample of the ultrasonic waves periodically.

8. The inspection system of claim 1, wherein the rotational device includes a linked chain comprised of a plurality of linking elements, wherein each linking element is connected to an adjacent linking element by a rolling element.

9. The inspection system of claim 1, wherein the rotational device includes a clamshell cover that surrounds the sleeve.

10. The inspection system of claim 9, wherein the clamshell cover is shaped to correspond to an outermost surface of the sleeve.

11. An inspection system for detecting one or rolled cup seals disposed underneath a sleeve, the inspection system comprising:

a linear transducer array connected to the sleeve and having a plurality of ultrasonic transducers each configured to transmit and receive ultrasonic waves, wherein the ultrasonic transducers direct the ultrasonic waves towards one or more cup seals that are disposed underneath the sleeve;

a rotational device configured to move the ultrasonic transducers around a circumference of the sleeve;

one or more processors in electronic communication with the linear transducer array; and a memory coupled to the one or more processors, the memory storing data into a database and program code that, when executed by the one or more processors, causes the inspection system to:

instruct the plurality of ultrasonic transducers to transmit and receive the ultrasonic waves, wherein the rotational device rotates around the sleeve as the plurality of ultrasonic transducers transmit and receive the ultrasonic waves;

continue to instruct the plurality of ultrasonic transducers to transmit and receive the ultrasonic waves until the linear transducer array translates around the circumference of the sleeve; and generate an acoustic representation of the one or more cup seals disposed underneath the sleeve based on the ultrasonic waves received by the plurality of ultrasonic transducers, wherein the acoustic representation of the one or more cup seals indicates sound dampened areas where the one or more cup seals contact the sleeve.

12. The inspection system of claim 11, further comprising a display device in electronic communication with the one or more processors, wherein the display device includes a screen.

13. The inspection system of claim 12, wherein the acoustic representation of the one or more cup seals is shown upon the screen.

14. The inspection system of claim 11, further comprising an encoder in electronic communication with the one or more processors, wherein the encoder is connected to the rotational device.

15. The inspection system of claim 14, wherein the encoder is configured to provide positional data indicating a relative position of the linear transducer array around the circumference of the sleeve to the one or more processors.

16. The inspection system of claim 11, wherein the one or more processors record a digital sample of the ultrasonic waves periodically.

17. A method for detecting one or more misaligned seals disposed underneath a sleeve, the method comprising:

instructing, by a computer, a plurality of ultrasonic transducers to transmit and receive ultrasonic waves as the plurality of ultrasonic transducers rotates around the sleeve, wherein the plurality of ultrasonic transducers are part of a linear transducer array;

continuing to instruct the plurality of ultrasonic transducers to transmit and receive the ultrasonic waves until the linear transducer array translates around a circumference of the sleeve; and generating an acoustic representation of one or more seals disposed underneath the sleeve based on the ultrasonic waves received by the plurality of ultrasonic transducers, wherein the acoustic representation of the one or more seals indicates sound dampened areas where the one or more seals contact the sleeve.

18. The method of claim 17, further comprising:
showing the acoustic representation of the one or more seals upon a screen of a display device.

19. The method of claim 17, further comprising:

rotating the linear transducer array about the circumference of the sleeve by a rotational device.

20. The method of claim 19, further comprising:

providing, by an encoder, positional data indicating a relative position of the linear transducer array to the computer, wherein the encoder is connected to the rotational device.

\* \* \* \* \*